(12) United States Patent
Johns (10) Patent No.: US 6,748,729 B1
(45) Date of Patent: Jun. 15, 2004

(54) MOWER CUT CONTROL APPARATUS AND METHOD

(76) Inventor: Wayne Dennis Johns, 18461 Range-Spur, Rogers, AK (US) 72756

( * ) Notice: Subject to any disclaimer, the term of this patent is extended or adjusted under 35 U.S.C. 154(b) by 0 days.

(21) Appl. No.: 10/375,448

(22) Filed: Feb. 26, 2003

(51) Int. Cl.[7] .............................................. A01D 34/03
(52) U.S. Cl. ..................................................... 56/17.1
(58) Field of Search ................................ 56/15.1, 15.2, 56/15.7, 14.7, 15.8, 15.9, 17.1, 16.7, DIG. 10, DIG. 3, DIG. 22; 180/6.48, 6.66

(56) References Cited

U.S. PATENT DOCUMENTS

| | | | |
|---|---|---|---|
| 4,057,355 A | 11/1977 | Allison .......................... 403/2 |
| 5,129,148 A | 7/1992 | Adams et al. ................. 29/898 |
| 5,138,825 A | 8/1992 | Trefz et al. .................... 56/11.1 |
| 5,142,850 A | 9/1992 | Patterson et al. ............. 56/17.1 |
| 5,507,580 A | 4/1996 | Dezzani et al. ............... 384/492 |
| 5,601,378 A | 2/1997 | Fukukawa et al. ........... 403/140 |
| 6,079,193 A | 6/2000 | O'Neill et al. ................ 56/17.1 |
| 6,085,508 A | 7/2000 | Miatt et al. .................... 56/17.1 |
| 6,101,242 A | 8/2000 | McAllister et al. ........... 379/88.02 |
| 6,101,794 A | 8/2000 | Christopherson et al. ...... 56/6 |
| 6,131,380 A | 10/2000 | Browning ...................... 56/16.7 |
| 6,170,242 B1 | 1/2001 | Gordon ......................... 56/15.8 |
| D443,285 S | 6/2001 | Sasaki et al. ................. D15/143 |
| D447,157 S | 8/2001 | Sasaki et al. ................. D15/143 |
| 6,352,360 B1 | 3/2002 | Yamada ........................ 366/9 |
| D459,732 S | 7/2002 | Sasaki et al. ................. D15/3 |

OTHER PUBLICATIONS

Owner's Manual, *Craftsman Lawn Tractor, Model No. 917.271920*, Sears, Roebuck and Co., Hoffman Estates, IL 60179 U.S.A., Sep. 2002.

Owner's Manual, *Craftsman Lawn Tractor, Model No. 917.272248*, Sears, Roebuck and Co., Hoffman Estates, IL 60179 U.S.A., Oct. 2002.

*Primary Examiner*—Robert E. Pezzuto
(74) *Attorney, Agent, or Firm*—Keisling Pieper & Scott PLC; Trent C. Keisling; David B. Pieper (57) ABSTRACT

Multiple range-of-motion mower deck support arm apparatus and kits are provided to improve the lateral float of a mower deck. Rod end bearing are utilized to provide an additional range of motion to prior art vertical only designs. The present invention utilizes a front left floating arm, a front right floating arm, a back left support assembly, and a back right support assembly which are all pivotally supported from the existing frame connection apertures and the existing mower connection apertures to vertically pivot in relation to the mower deck and vertically, horizontally, and rotationally pivot in relation to the lawn tractor frame.

17 Claims, 10 Drawing Sheets

MOWER CUT CONTROL APPARATUS AND METHOD

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates to an improved swing arm for existing lawn mowers. In particular, the present invention is designed as a replacement arm or kit for improving the limited movement of pin arm riding lawn mowers.

2. Description of the Prior Art

Several United States Patents should be considered. These include U.S. Pat. No. 6,085,508 issued to Miatt et al. on Jul. 11, 2000; U.S. Pat. No. 6,131,380, issued to Browning on Oct. 17, 2000; U.S. Pat. No. 6,079,193 issued to O'Neill et al. on Jul. 27, 2000; U.S. Pat. No. 6,101,794 issued to Christopherson et al. on Aug. 15, 2000; and U.S. Pat. No. 6,101,242 issued to Gordon on Jan. 9, 2001. Other patents to be considered are U.S. Pat. No. D459,732 entitled Rod-end bearing; U.S. Pat. No. 6,352,368 entitled Rod end bearing; U.S. Pat. No. D447,157 entitled Rod-end bearing; U.S. Pat. No. D443,285 entitled Rod-end bearing; U.S. Pat. No. 5,601,378 entitled Rod-end bearing device; U.S. Pat. No. 5,507,580 entitled Rod end bearing for aircraft use; U.S. Pat. No. 5,129,148 entitled Method for making a non-metallic, fiber reinforced rod end bearing assembly; and 4,057,355 Frangible tie rod end bearing seat. Each of these patents is hereby incorporated by reference in their entirety.

The most relevant prior art for the present invention is found in the owner's manuals for the type and construction of fixed upper and lower pin mounting lawn tractors for which this invention applies. Specific Brands for these mowers are SEARS (trademark), POULAN (trademark), and HUSQUARNA (trademark). Examples of these types of movers and their owners manuals may be found as: SEARS CRAFTSMAN (trademark) 20 hp, 40 in. Deck Lawn Tractor sold under Item #07107192000, Mfr. Model #27192; and Sears Craftsman (trademark) 20 hp, 48 in. Deck Deluxe Lawn Tractor sold under Item #07107224000, Mfr. Model #27224. These prior art mounting systems are shown in FIGS. 1 through 8.

Figure 1:
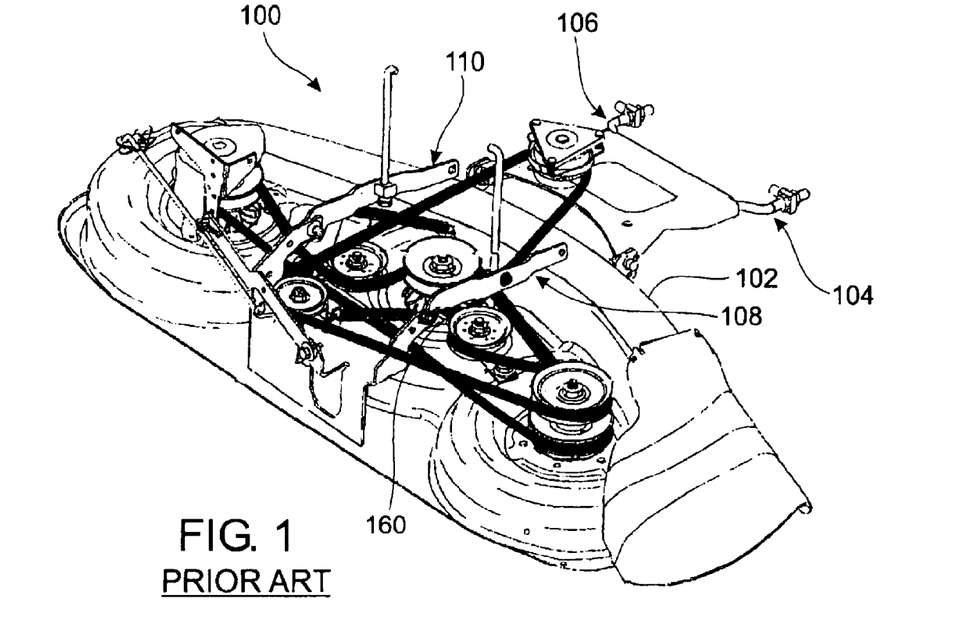
FIG. 1 is a prior art view of a first type of mower deck suspension system.

FIG. 1 shows a first variation of a prior art fixed pin quad arm mounting system 100 for a mower deck 102. Four suspension joints 104, 106, 108, 110 are used to hold the mower deck 102 including a front right deck suspension 104, front left deck suspension 106, back right deck suspension 108, and back left deck suspension 110.

Figure 2:
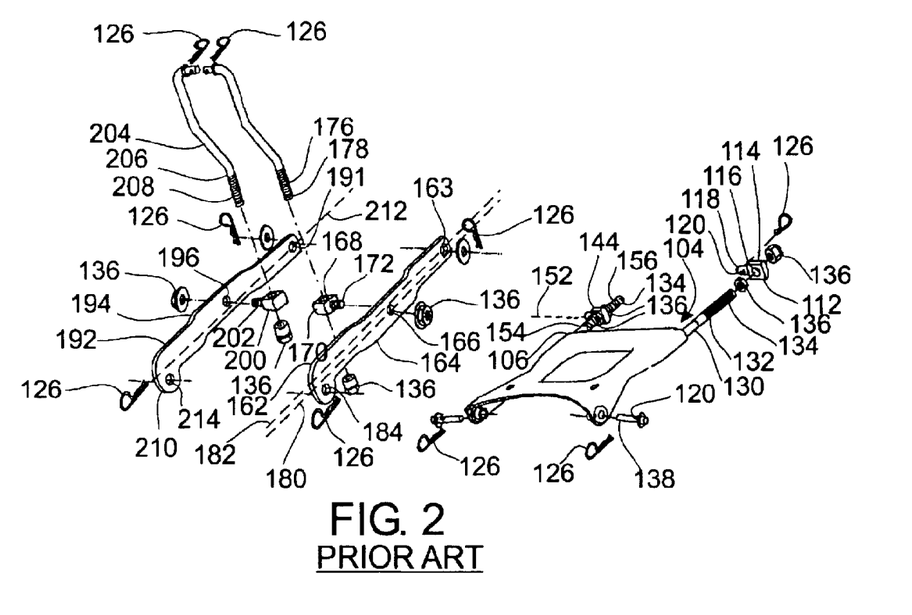
FIG. 2 is an exploded view of the support arms used in FIG. 1.
Figure 3:
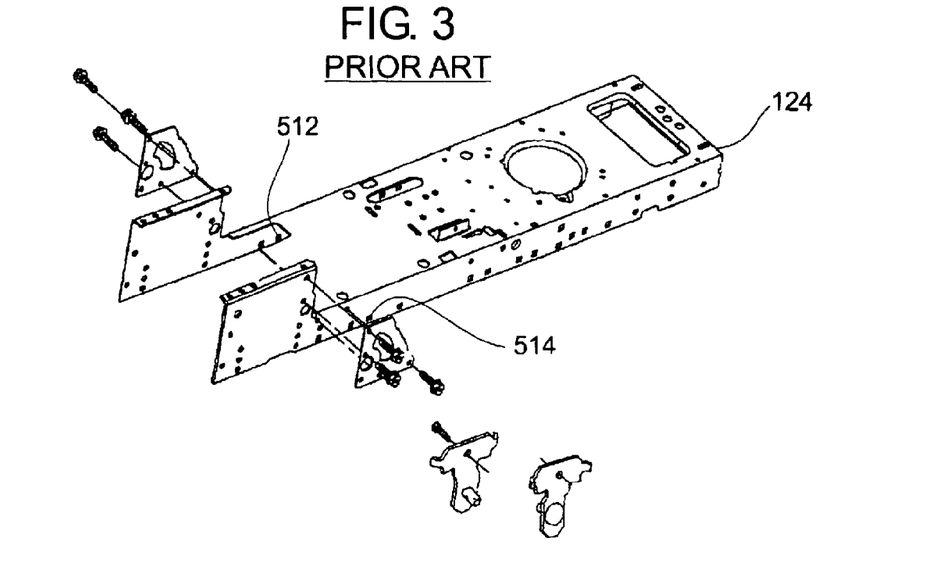
FIG. 3 is a view of the mower frame showing frame apertures and cutouts.

As better shown by FIG. 2, the front right deck suspension 104 uses a front right perpendicular block pin 112 having a front right pin head 114 defining a front right link aperture 116 and also having a front right pin extension 118 defining a spring clip aperture 120. The front right pin extension 118 is adapted to pass through a pin opening 122 in the mower frame 124 so that the front right perpendicular pin 112 is secured to the mower frame 124 with a retaining spring 126 positioned in the spring clip aperture 120. In this manner, the front right pin axis 128 of the front right perpendicular pin 112 is held perpendicular to the frame 124 and the front right perpendicular pin 112 can only rotate while maintaining the perpendicular relationship of the axis 128 to the frame 124. This limitation is important to understand because it defines the vertical only movement of the front right link 130 which causes problems solved by the present invention.

The front right link 130 defines a front right axial link extension 132 having extension threads 134 adapted to pass through the front right link aperture 116. Nuts 136 are screwed onto both sides of the front right axial link extension 132 to fixably secure the front right perpendicular pin 112 to the front right link 130. Thus, the front right link 130 is fixably secured to the front right perpendicular pin 112. Due to this connection, the front right link 130 is held perpendicular to the front right perpendicular pin 112 and the front right link 130 can only pivot in a vertical motion to move in a parallel relationship to the mower frame 124. No rotational or horizontal movement is allowed by this connection. Thus, this connection at least partially controls and limits how the mower deck 102 can be positioned.

Figure 4:
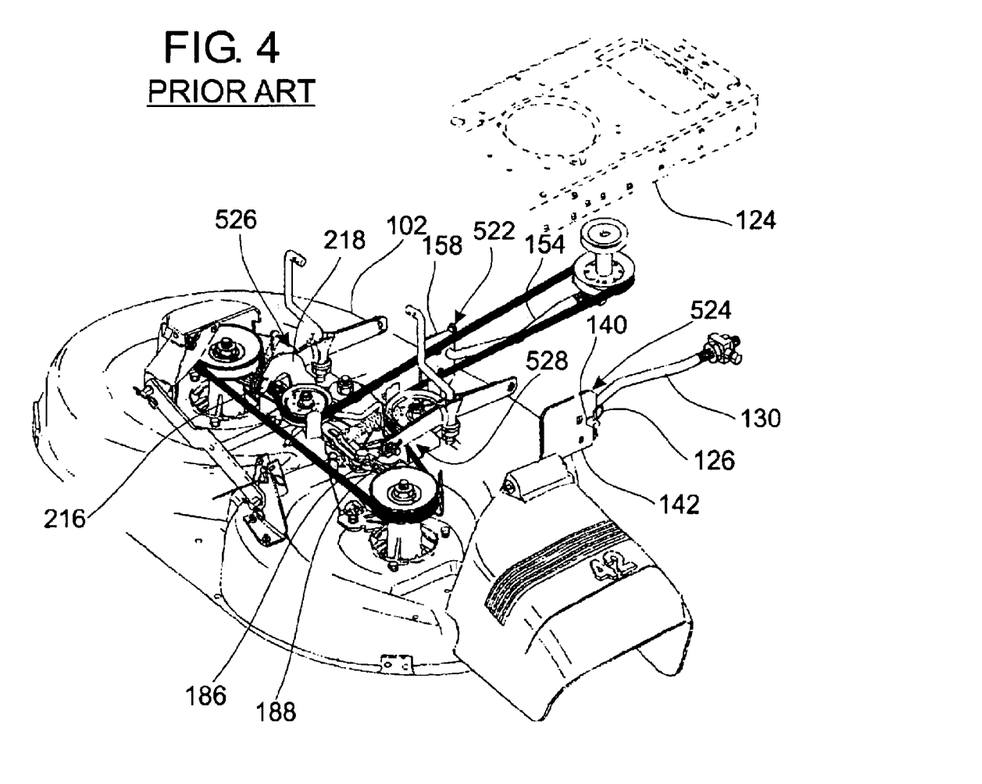
FIG. 4 is a prior art view of a second type of mower deck suspension system.
Figure 5:
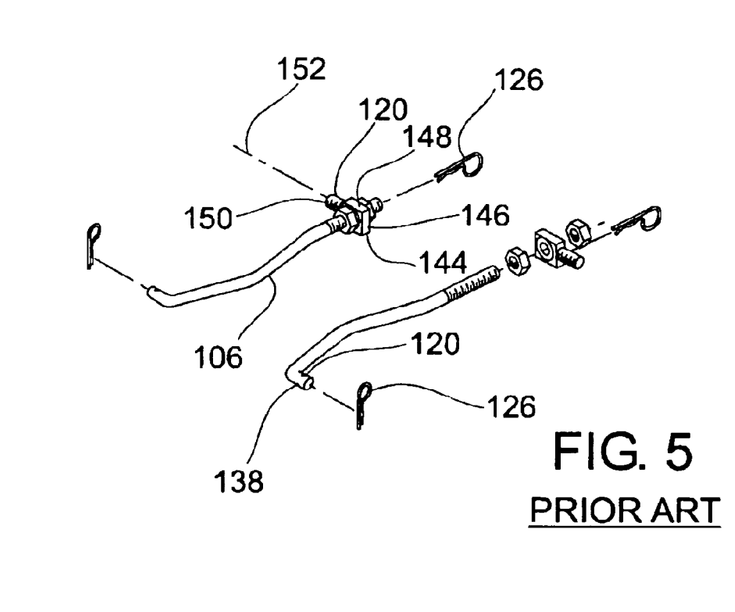
FIG. 5 is an exploded view of the support arms used in FIG. 4.
Figure 6:
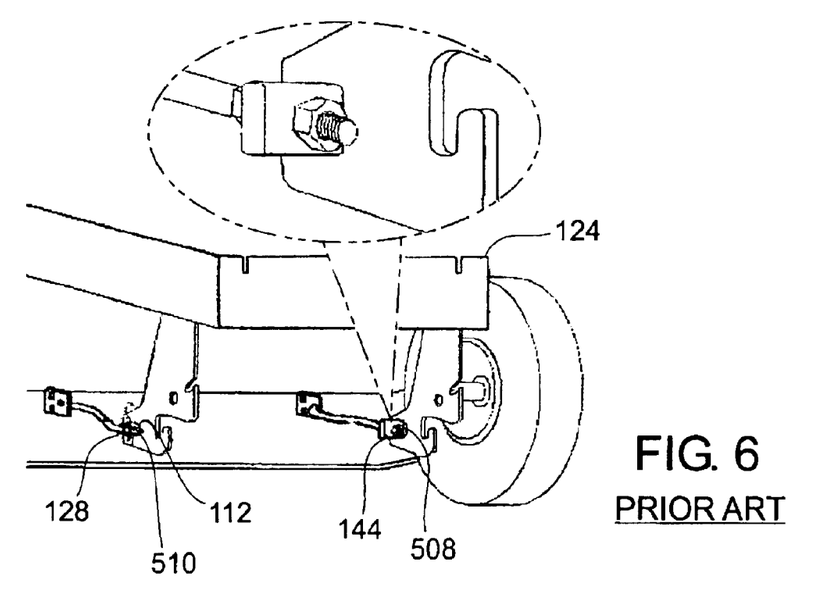
FIG. 6 is a front view of the front arms of FIG. 4 supporting the mower deck off of the frame.
Figure 7:
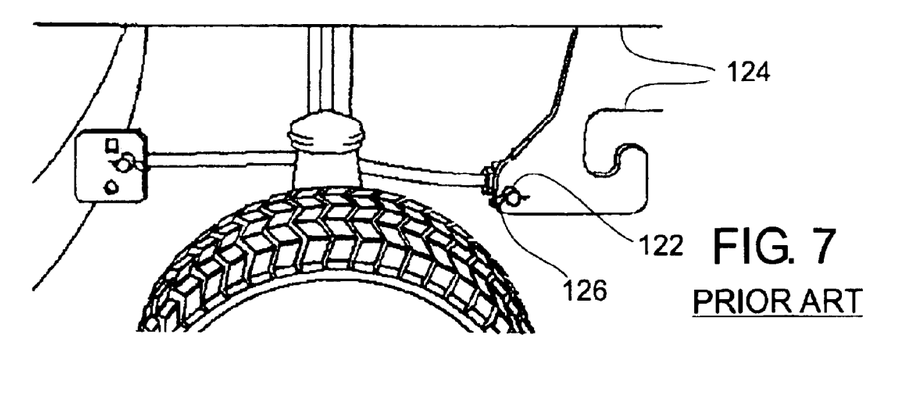
FIG. 7 is a side view of the front arms of FIG. 4 supporting the mower deck off of the frame.
Figure 8:
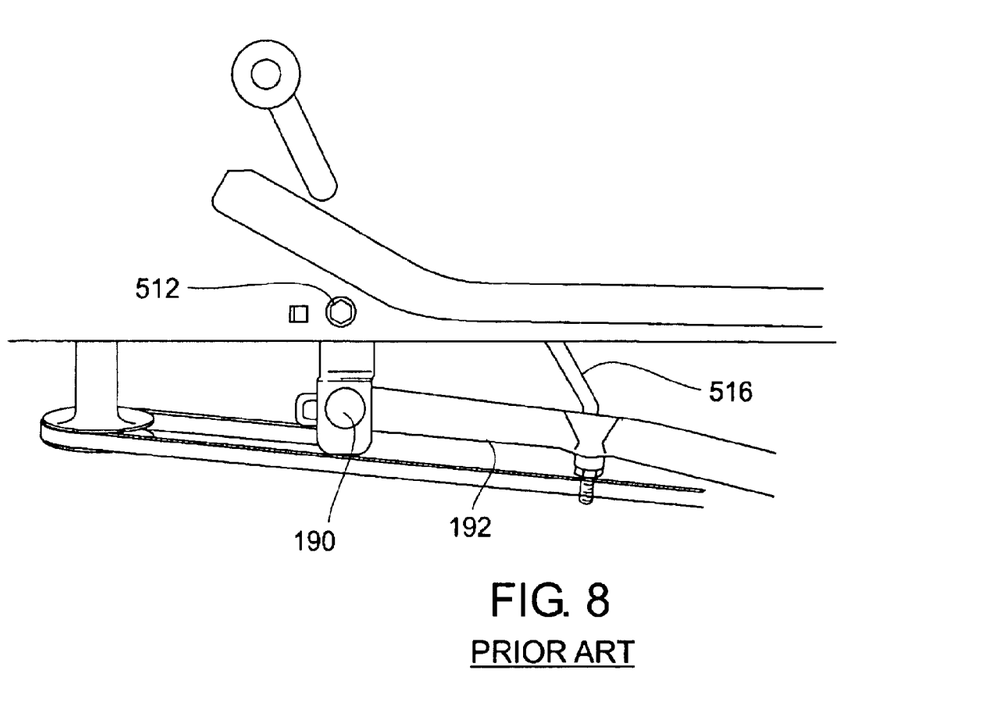
FIG. 8 is a side view of the back arms of FIG. 4 supporting the mower deck off of the frame.

As shown in FIGS. 2 and 5, the front right link 130 also uses or defines a front right deck pin 138 which also defines a spring clip aperture 120. In FIG. 5, the front right deck pin 138 is constructed by bending the front right link 130 to a perpendicular axis position. As shown in FIG. 4, the front right deck pin 138 is then adapted to pass through a pin aperture 140 in the front right deck flange 142 and a retaining spring 126 is used to hold the front right link 130 to the front right deck flange 142.

The front left deck suspension 106 uses a front left perpendicular pin 144 having a front left pin head 146 defining a front left link aperture 148 and also having a front left pin extension 150 defining a spring clip aperture 120. The front left pin extension 150 is adapted to pass through a pin opening 122 in the mower frame 124 so that the front left perpendicular pin 144 is secured to the mower frame 124 with a retaining spring 126 positioned in the spring clip aperture 120. In this manner, the front left pin axis 152 of the front left perpendicular pin 144 is held perpendicular to the frame 124 and the front left perpendicular pin 144 can only rotate while maintaining the perpendicular relationship of the front left pin axis 152 to the frame 124. This is important because it defines the movement of the front left link 154.

The front left link 154 defines a front left axial link extension 156 having extension threads 134 adapted to pass through the front left link aperture 148. Nuts 136 are screwed onto both sides of the front left axial link extension 156 to fixably secure the front left perpendicular pin 144 to the front left link 154. Thus, the front left link 154 is secured to the front left perpendicular pin 144. Due to this connection, the front left link 154 is held perpendicular to the front left perpendicular pin 144 and the front left link 154 can only move in a parallel relationship to the mower frame 124. This controls how the mower deck 102 can be positioned.

The front left link 154 defines a front left deck pin 156 which also defines a spring clip aperture 120. The front left deck pin 156 is constructed by bending the front left link 154 to a perpendicular axis position as shown in FIG. 1. The front left deck pin 156 is then adapted to pass through a pin aperture 140 in the front left deck flange 158 and a retaining spring 126 is used to hold the front left link 154 to the front left deck flange 158.

As noted by the front right and front left deck suspensions 104, 106, the limited perpendicular movement requires equal lifting on both side of the mower deck and limits any uneven vertical movement of the mower deck. If an attempt is made to raise only the right side of the mower deck while maintaining a lower position for the left side of the mower deck, one may see that the front right deck suspension 104 would be required to move in an arcing motion, and a twisting movement may be imparted to the left deck suspensions 106. However, the fixed pin arrangement of this design does not allow for either of these motions. This previously unrecognized problem with this design and the associated limitations were discovered after one of these units consistently caused scalping problems when mowing a fine textured bermuda grass. These fixed perpendicular movements prohibit the mower deck from properly following uneven ground contours during mowing. Instead of requiring a complete redesign, the present invention ingeniously and inexpensively solves these problems without requiring excessive amounts of new tooling or design changes.

In the older mower designs, additional problems may also be caused by the back right deck suspension 108 and the back left deck suspension 110. These suspension systems suffer from different, but similar problems in the way they control the movement of the mower deck 102.

The back right deck suspension 108 utilizes a back right frame pin 160 extending perpendicularly from the mower frame 124. The back right frame pin 160 defines a spring clip aperture 120 for a retaining pin 126. The back right frame pin 160 is adapted to pass through a back right frame pin aperture 163 on a back right suspension arm 162 such that a retaining spring 126 placed in the spring clip aperture 120 will hold the back right suspension arm 162 to the mower frame 124 using the back right frame pin 160. This fixes the movement of the back right suspension arm 162 to be a rotation around the perpendicular axis of the back right frame pin 160 connected to the mower frame 124.

The back right suspension arm 162 has a back right offset 164 defining a back right central aperture 166. The back right central aperture 166 is connected to a back right central pin 168 having a back right pin head 170 defining a back right pin aperture 140 and also having a back right pin extension 172 defining a back right spring clip aperture 120. A back right lifting link 174 defines a back right lifting extension 176 having right lifting threads 178 passing through the back right lifting aperture 173 and the back right lifting link 174 is secured to the back right pin head 170 using a nut 136.

The back right suspension arm 162 also has a back right lower dog ear 180 extending downward from the back right arm central axis 182 of the back right suspension arm 162. The back right lower dog ear 180 defines a back right ear aperture 184 adapted to connect to a back right fixed position mower pin 186 extending from the back right deck flange 188. The back right deck flange 188 is fixed to and extends upwardly from the mower deck 102. This back right suspension arm 162 to back right deck flange 188 connection also has the effect of limiting travel by only allowing the back right suspension arm 162 to travel in a perpendicular arc from the mower deck 102.

The back left deck suspension 108 utilizes a back left frame pin 190 extending perpendicularly from the mower frame 124. The back left frame pin 190 defines a spring clip aperture 120 for a retaining pin 126. The back left frame pin 190 is adapted to pass through a back left frame pin aperture 191 on a back left suspension arm 192 such that a retaining spring 126 placed in the spring clip aperture 120 will hold the back left suspension arm 192 to the mower frame 124 using the back left frame pin 190. This fixes the movement of the back left suspension arm 192 to be a rotation around the perpendicular axis of the back left frame pin 190 connected to the mower frame 124.

The back left suspension arm 192 has a back left offset 194 defining a back left central aperture 196. The back left central aperture 196 is connected to a back left central pin 198 having a back left pin head 200 defining a back left pin aperture 140 and also having a back left pin extension 202 defining a back left spring clip aperture 120. A back left lifting link 204 defines a back left lifting extension 206 having left lifting threads 208 passing through the back left pin aperture 140 and the back left lifting link 204 is secured to the back left pin head 200 using a nut 136.

The back left suspension arm 192 also has a back left lower dog ear 210 extending downward from the back left arm central axis 212 of the back left suspension arm 192. The back left lower dog ear 210 defines a back left ear aperture 214 adapted to connect to a back left fixed position mower pin 216 extending from the back left deck flange 218. The back left deck flange 218 is fixed to and extends upwardly from the mower deck 102. This back left suspension arm 192 to back left deck flange 218 connection also has the effect of limiting travel by only allowing the back left suspension arm 192 to travel in a perpendicular arc from the mower deck 102.

As may be understood by reference to the limited vertical only movement at the back of the mower deck 102, the suspension system at the back of the deck 102 has the same problems as described for the front of the mower deck. In this manner, the front of the mower deck 102 moves along an arc defined by the perpendicular movements of the front right link 130 and the front left link 154. Similarly, the back of the mower deck 102 moves in an arc defined by the back right suspension arm 162 and the back left suspension arm 192. This provides a good up and down movement of the mower deck 102 and allows separate front to back raising of the deck 102 when encountering differences in the terrain in the cutting lawn. However, this does not allow for a twisting movement of the mower deck 102 where only one side of the mower deck 102 is raised in relation to the other side. Other than a minor amount of slop or play in the joint, the fixed position of the pins held by the retainer clips only allows for a vertical movement and does not allow for the twisting movement necessary when only one side of the mower deck 102 needs to be raised in relation to the opposite side. As previously noted, this causes scalping of the grass being cut because this deck suspension does not allow the deck to accurately follow the contours of the ground on which the grass is growing.

The inventor of the present invention recognized the limitations of the prior art suspension system as the cause of this scalping problem and has built a solution that is easily retrofit to an existing mower by the homeowner or repair shop operating on the mower. The present invention is also designed to be a cost effective direct fit replacement for the components of these prior art designs to allow for an improved design for future built mowers. Thus, the present invention has adopted an extremely efficient solution that is easily implemented to existing mowers to fix this problem.

SUMMARY OF THE INVENTION

In accordance with one exemplary embodiment of the present invention, a improved mower deck support arm apparatus is provided that is designed to improve the lateral float of a mower deck. The present invention provides a mower support replacement kit that is adapted to improve the lateral float of a mower deck by providing a new movement capability for an older mower design. The mower deck is suspended from a lawn tractor assembled support frame defining front left, front right, back left, and back right frame apertures and a back left, and back right deck height adjustment bar. These items are attached to support arms connected to front left, front right, back left, and back right vertical-only pivot connections on the mower deck which only allow for vertical movement of the mower deck. This prior art system fails to provide for proper lateral movement of the mower deck. The present invention has recognized this limitation and provides an improved connection by adding a range of motion to the teachings of the prior art. In one preferred embodiment, the present invention utilizes a front left floating arm pivotally supported from the frame to vertically pivot in relation to the mower deck and vertically, horizontally, and rotationally pivot in relation to the lawn tractor frame; a front right floating arm pivotally supported from the frame to vertically pivot in relation to the mower deck and vertically, horizontally, and rotationally pivot in relation to the lawn tractor frame; a back left support assembly pivotally supported from the frame to vertically pivot in relation to the mower deck and vertically, horizontally, and rotationally pivot in relation to the lawn tractor frame; and a back right support assembly pivotally supported from the frame to vertically pivot in relation to the mower deck and vertically, horizontally, and rotationally pivot in relation to the lawn tractor frame. Thus, a principal object of the present invention to provide a lateral range of motion to a vertical and linear motion mower deck.

Another object of the present invention is to provide replacement arms that utilize existing connections to replace the support arms on older mower designs while still allowing their use on new models of lawn tractors.

Yet another object of the present invention to provide both front and rear support systems to allow for the lateral movement of the mower deck.

These and other objects and advantages of the present invention, along with features of novelty appurtenant thereto, will appear or become apparent in the course of the descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

The present invention uses the same general type of mounting as the prior art while providing vast improvements through some relatively simple modifications that had never been realized in the prior art. The factory mower deck adjustments will stay the same, but an improved cut will be enabled to eliminate scalping in tight turns and allow for a good cut on hillsides, as well as allowing the mower to stay in adjustment longer than the original factory equipment shown in the prior art.

As can be seen in FIGS. 9–17, one exemplary embodiment of the present invention is generally designated by reference numeral 500. FIGS. 9–17 show a mower support replacement kit apparatus 500 adapted to improve the lateral float of a mower deck 102. The mower deck 102 is a previously constructed unit that has front left, front right, back left, and back right vertical-only pivot connection 528. The mower deck 102 is suspended from a lawn tractor support frame 506 that defines front left, front right, back left, and back right frame aperture 514 and a back left, and back right deck height adjustment bar 174. The improvement of the present invention is seen in the mower support replacement kit apparatus 500 used to support the mower deck 102 off of the mower frame 124. The mower support replacement kit apparatus 500 includes a front floating arm assembly using and a back floating arm assembly.

Figure 9:
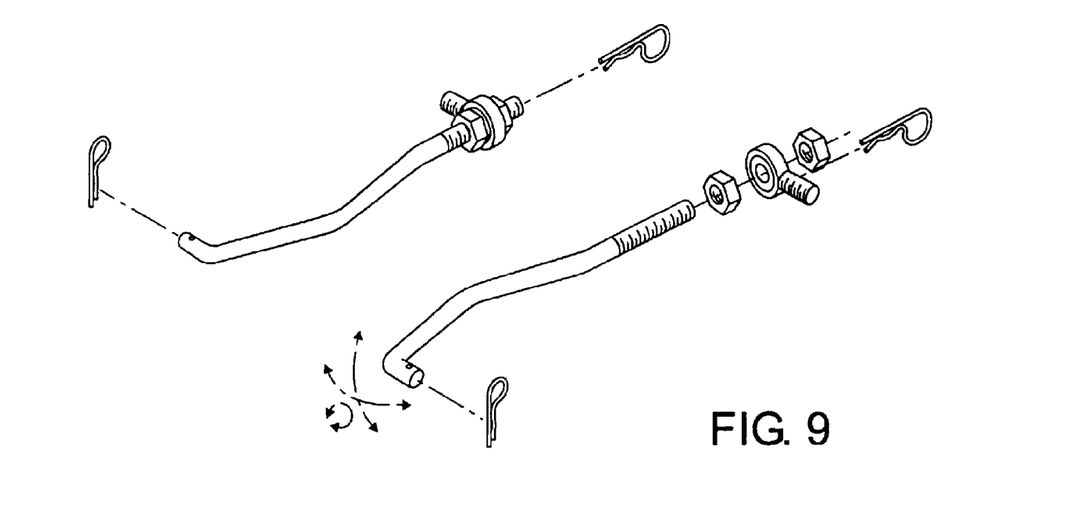
FIG. 9 is a perspective view of the multiple range movement front arms of the present invention.

The front floating arm assembly uses a front left floating arm 532 and a front right floating arm 550. The front left floating arm 532 is pivotally supported from the frame to vertically pivot in relation to the mower deck 102 as is known in the prior art. However, the improvement of the present invention is provided because, in contrast to the prior art design, the front left floating arm 532 is mounted to vertically, horizontally, and rotationally pivot in relation to the lawn tractor frame. In a similar manner, the front right floating arm 550 is pivotally supported from the frame to vertically pivot in relation to the mower deck 102 and then vertically, horizontally, and rotationally pivot in relation to the lawn tractor frame. The combination of both of these movements allows the front floating arm assembly to control the position of the mower deck 102 while allowing it to vertically and horizontally float while maintaining its linear position along the front to back length of the mower.

The front left floating arm 532 includes a front left main body 534, a front left two dimensional pivot 544, and a front left frame pin extension 548. The front left main body 534 is connected to the front left vertical-only pivot connection 522 on the mower deck 102. This is a pin and aperture connection. This allows for vertical movement of the front left floating arm 532 in relation to the mower deck 102. The front left main body 534 includes a front left first end 538, a front left midsection 540, and a front left frame end 542 defining a front left body axis 536. At the front left frame end 542 of the front left floating arm 532, the front left frame pin extension 548, also known as a front left connecting rod 548, is connected to the front left main body 534 by the front left two dimensional pivot 544. The front left two dimensional pivot 544 is shown as a rod end bearing. A rod end bearing is basically a multiple angle bearing mounted in a housing. The front left two dimensional pivot 544 includes a front left frame pin extension 548 that is connected to the front left frame aperture 508 on the mower frame 124.

The front right floating arm 550 includes a front right main body 552, a front right two dimensional pivot 554, and a front right frame pin extension 556. The front right main body 552 is connected to the front right vertical-only pivot connection 524 on the mower deck 102 so that the front right main body 552 may vertically pivot in relation to the mower deck 102. The front right frame pin extension 556 is connected to the front right main body 552 by the front right two dimensional pivot 554. The front right frame pin extension 556 and front right two dimensional pivot 554 are shown as a rod end bearing. The front right frame pin extension 556 is adapted for connection to the front right frame aperture 510 on the mower frame 124.

Thus, one may see that one key aspect of the present invention uses a floating front support arm apparatus 502 to enhance or improve the lateral float of an undercarriage mower deck 102 having a vertical only connection point. The invention is adapted to support the mower deck 102 off of a mower frame 124 having a connection aperture. The floating front support arm includes a main body, a connecting rod, and a two dimensional support pivot. The front support main body defines a front support body axis and includes a front support first end, a front support midsection, and a front support frame end. A front support connecting rod is attached to the front support main body by a front two dimensional support pivot 544. The front two dimensional support pivot 544 connects the front support frame end of the front support main body to the front support connecting rod such that the front support connecting rod is perpendicular to the front support body axis. The front two dimensional support pivot 544 provides longitudinal or linear support to the front support main body at the front support frame end while allowing vertical, horizontal, and rotational movement of the front support main body in relation to the mower frame 124. In the preferred embodiment, the front two dimensional support pivot 544 is constructed as a front left rod end bearing 546.

Figure 10:
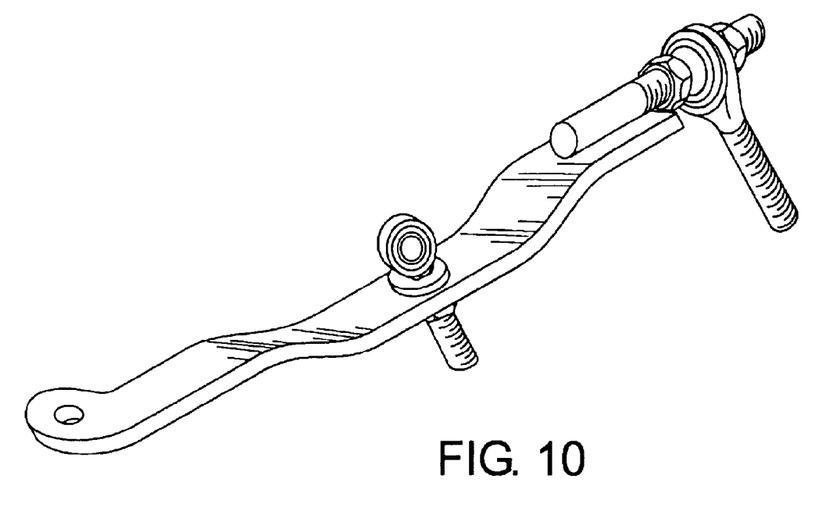
FIG. 10 is a perspective view of a multiple range movement back arm of the present invention.
Figure 11:
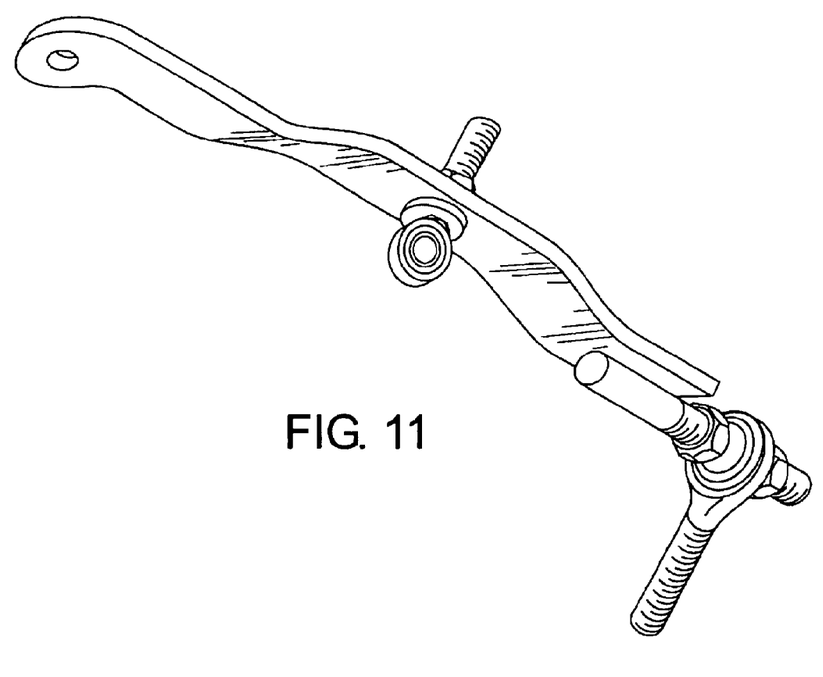
FIG. 11 is another perspective view of a multiple range movement back arm of the present invention.

The back floating arm assembly uses a back left support assembly 558 and a back right support assembly 658.

The back left support assembly 558 is pivotally supported from the back left frame aperture 512 on the frame and is adapted much like the prior art system to only vertically pivot in relation to the mower deck 102. Yet again, the improvement in the lateral float is found in the opposition to the prior art teachings to vertically, horizontally, and rotationally pivot in relation to the lawn tractor frame. In a mirror construction, the back right support assembly is also pivotally supported from the back right frame aperture 514 on the frame to only vertically pivot in relation to the mower deck 102 and vertically, horizontally, and rotationally pivot in relation to the lawn tractor frame. The combination of both of these movements allows the back floating arm assembly to control the position of the mower deck 102 while allowing it to vertically and horizontally float while maintaining its linear position along the front to back length of the mower.

Figure 13:
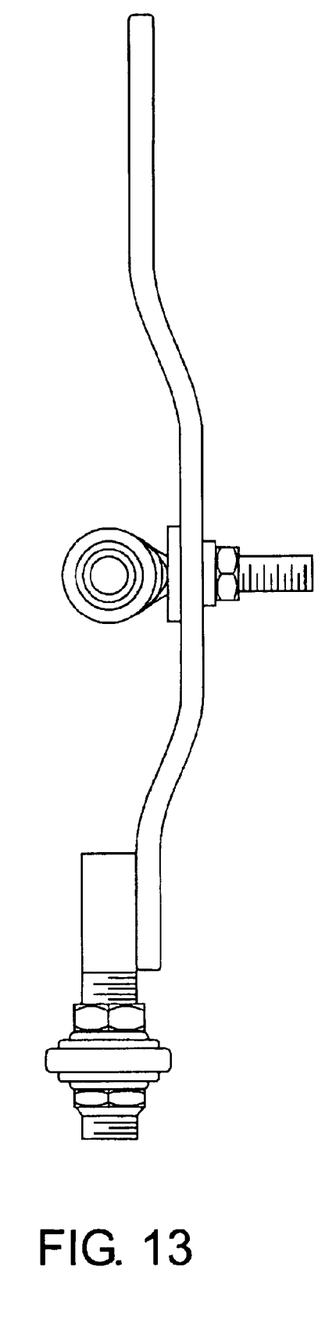
FIG. 13 is a top view of a back left multiple range movement arm of the present invention.
Figure 14:
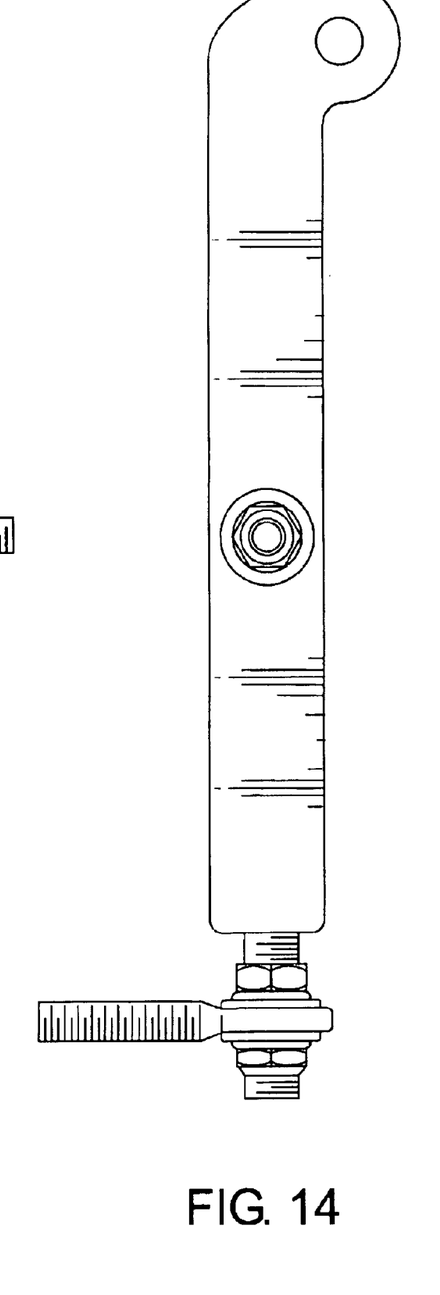
FIG. 14 is a side view of a back left multiple range movement arm of the present invention.

The back left support assembly 558 includes a back left floating arm 560 and a back left drop frame. The back left floating arm 560 includes a back left main body 562, a back left vertically oriented two dimensional central pivot 584, a back left horizontally oriented two dimensional end pivot 592, and a back left frame pin extension 600. The back left main body 562 defines a back left deck end 564, a back left midsection 572, and a back left frame end 580 oriented along a back left main body central axis 582. The back left deck end 564 of the back left main body 562 includes a back left dog ear support 566 defining a back left deck connection aperture 568. The back left deck connection aperture 568 is connected to the back left vertical-only pivot connection 526 on the mower deck 102 to define the vertical pivoting movement of the back left floating arm 560 in relation to the mower deck 102. The back left midsection 572 defines a back left offset section 574 having a back left parallel axis 576 and defining a back left mid support bearing aperture 578 for mounting the back left vertically oriented two dimensional central pivot 584. The back left vertically oriented two dimensional central pivot 584 includes a back left midsection support bearing 586 having a back left mid bearing extension 590 pivotally connected into the back left mid support bearing aperture 578 with these items combined and shown as a back left mid rod end bearing 588. The back left frame end 580 includes a back left threaded rod 570 extending along the back left bearing axis 598. The back left threaded rod 570 is used for an adjustable connection to the back left horizontally oriented two dimensional end pivot 592. The back left horizontally oriented two dimensional end pivot 592 includes a back left frame end support bearing 594 shown as a back left frame rod end bearing 596 having a back left frame pin extension 600. The back left frame pin extension 600 defines a back left bearing axis 598 extending perpendicular to the back left main body central axis 582.

The back left vertically oriented two dimensional central pivot 584 is slideably connected to the back left deck height adjustment bar 204. This allows an arcing vertical and pivoting movement of the back left main body 562 in relation to the back left deck height adjustment bar 204.

The back left frame end 580 of the back left main body 562 is connected to the back left frame pin extension 600 by the back left horizontally oriented two dimensional end pivot 592. The back left frame pin extension 600 is pivotally connected to the back left drop frame 606 suspended from the mower frame 124. This allows for vertical, horizontal, and rotational movement of the back left main body 562 in relation to the mower frame 124.

Figure 15:
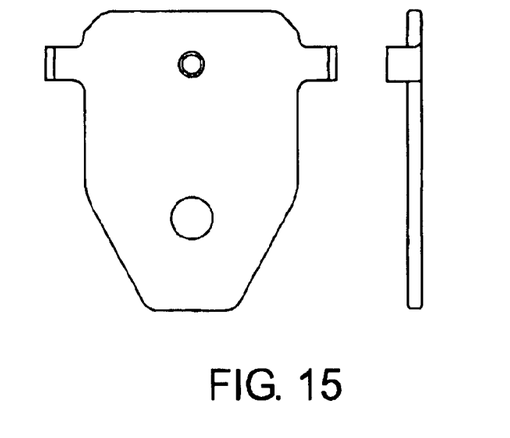
FIG. 15 is a front view of a back arm to frame hangar bracket of the present invention.
Figure 16:
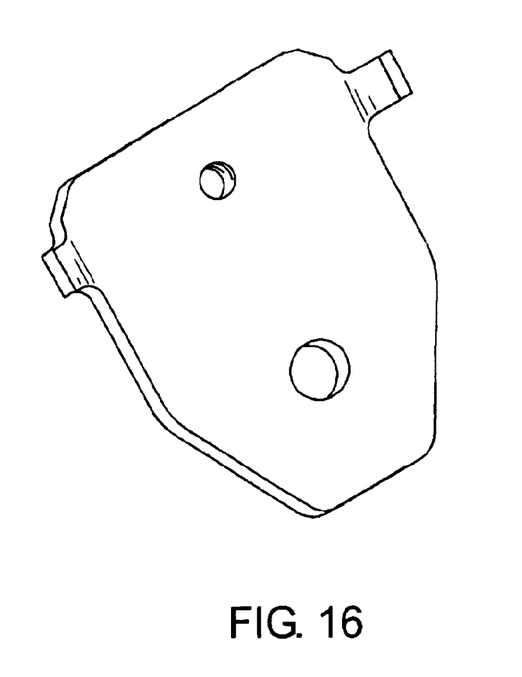
FIG. 16 is a perspective view of a back arm to frame hangar bracket of the present invention.
Figure 17:
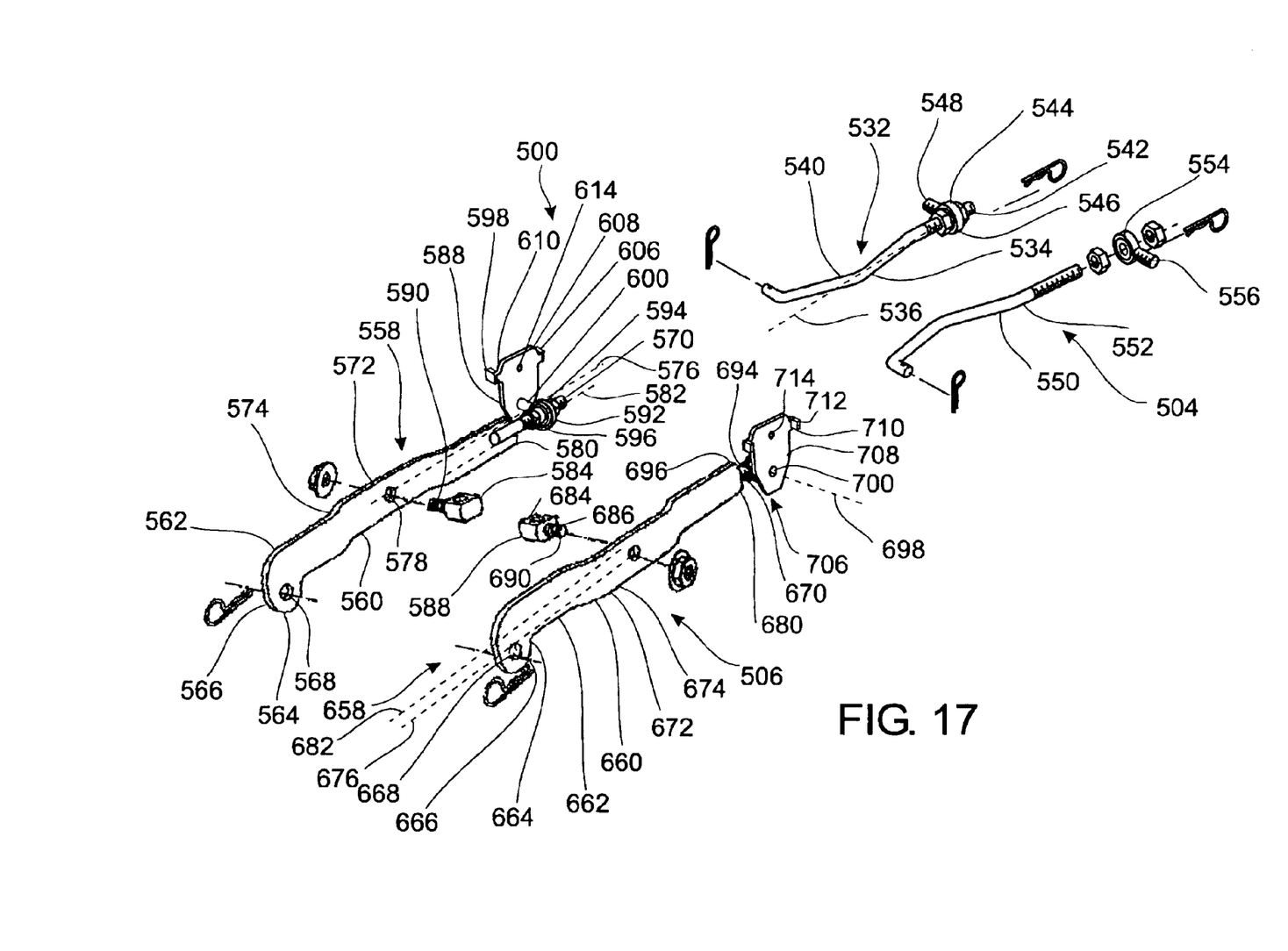
FIG. 17 is a perspective view of an improved motion replacement arm kit of the present invention.

The back left drop frame 606 includes a back left hangar bracket 608 defining at least one back left connection ear 610 and preferably has back left first and second connection ears 610. The back left drop frame 606 also defines a back left hangar aperture 614 for connection to the back left frame pin extension 600.

Figure 12:
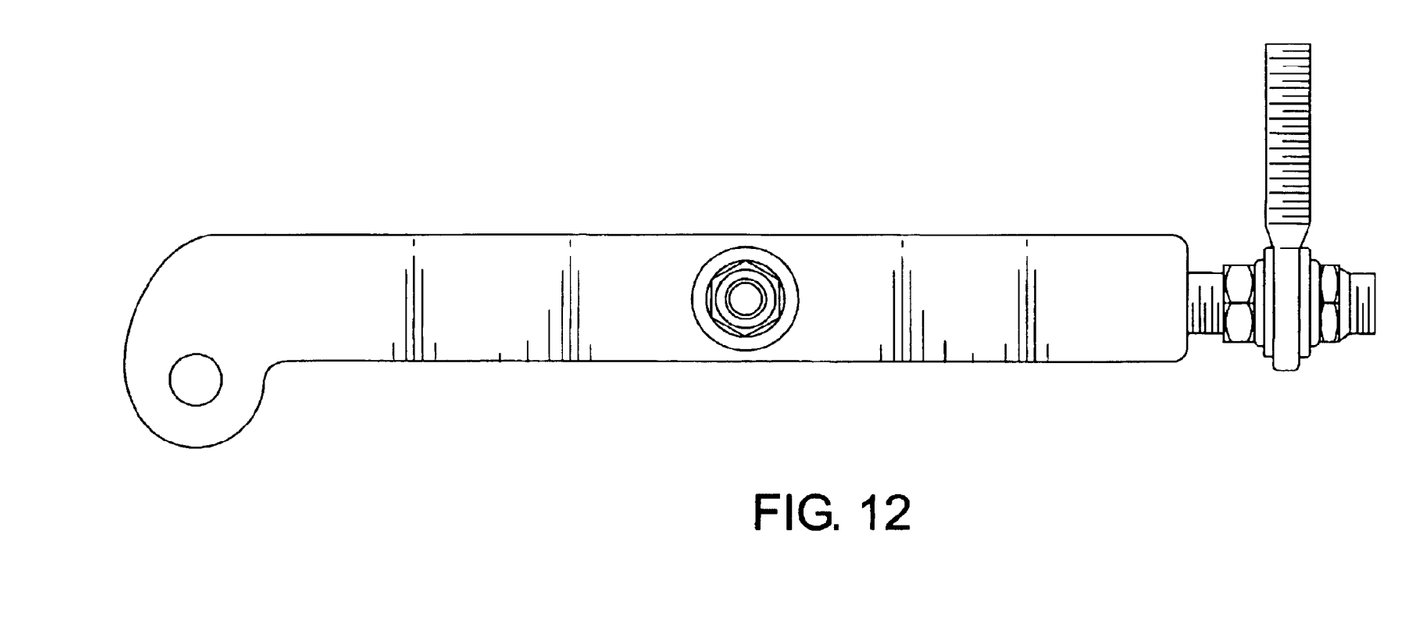
FIG. 12 is a side view of a back right multiple range movement arm of the present invention.

The back right support assembly 658 is basically a mirror image of the back left support assembly 558. The back left support assembly 658 is pivotally supported from the back left frame aperture 610 on the frame and is adapted much like the prior art system to only vertically pivot in relation to the mower deck 102. Yet again, the improvement in the lateral float is found in the opposition to the prior art teachings to vertically, horizontally, and rotationally pivot in relation to the lawn tractor frame. In a mirror construction, the back right support assembly is also pivotally supported from the back right frame aperture 614 on the frame to only vertically pivot in relation to the mower deck 102 and vertically, horizontally, and rotationally pivot in relation to the lawn tractor frame. The combination of both of these movements allows the back floating arm assembly to control the position of the mower deck 102 while allowing it to vertically and horizontally float while maintaining its linear position along the front to back length of the mower.

The back left support assembly 658 includes a back left floating arm 660 and a back left drop frame. The back left floating arm 660 includes a back left main body 662, a back left vertically oriented two dimensional central pivot 684, a back left horizontally oriented two dimensional end pivot 692, and a back left frame pin extension 700. The back left main body 662 defines a back left deck end 664, a back left midsection 672, and a back left frame end 680 oriented along a back left main body central axis 682. The back left deck end 664 of the back left main body 662 includes a back left dog ear support 666 defining a back left deck connection aperture 668. The back left deck connection aperture 668 is connected to the back left vertical-only pivot connection 626 on the mower deck 102 to define the vertical pivoting movement of the back left floating arm 660 in relation to the mower deck 102. The back left midsection 672 defines a back left offset section 674 having a back left parallel axis 676 and defining a back left mid support bearing aperture 678 for mounting the back left vertically oriented two dimensional central pivot 684. The back left vertically oriented two dimensional central pivot 684 includes a back left midsection support bearing 686 having a back left mid bearing extension 690 pivotally connected into the back left mid support bearing aperture 678 with these items combined and shown as a back left mid rod end bearing 688. The back left frame end 680 includes a back left threaded rod 670 extending along the back left bearing axis 698. The back left threaded rod 670 is used for an adjustable connection to the back left horizontally oriented two dimensional end pivot 692. The back left horizontally oriented two dimensional end pivot 692 includes a back left frame end support bearing 694 shown as a back left frame rod end bearing 696 having a back left frame pin extension 700. The back left frame pin extension 700 defines a back left bearing axis 698 extending perpendicular to the back left main body central axis 682.

The back left vertically oriented two dimensional central pivot 684 is slideably connected to the back left deck height adjustment bar 616. This allows an arcing vertical and pivoting movement of the back left main body 662 in relation to the back left deck height adjustment bar 616.

The back left frame end 680 of the back left main body 662 is connected to the back left frame pin extension 700 by the back left horizontally oriented two dimensional end pivot 692. The back left frame pin extension 700 is pivotally connected to the back left drop frame 706 suspended from the mower frame 124. This allows for vertical, horizontal, and rotational movement of the back left main body 662 in relation to the mower frame 124.

The back left drop frame 706 includes a back left hangar bracket 708 defining at least one back left connection ear 710 and preferably has back left first and second connection ears 710. The back left drop frame 706 also defines a back left hangar aperture 714 for connection to the back left frame pin extension 700.

Thus, one may see that another key aspect of the present invention uses a floating height adjustment back support arm apparatus 504 to enhance or improve the lateral float of an undercarriage mower deck 102 having a vertical only connection point. The invention is adapted to support the mower deck 102 off of a mower frame 124 having a back support arm connection aperture. The floating height adjustment back support arm apparatus 504 includes a back main body, a back frame end connecting rod, a back frame end support bearing, and a back midsection support bearing. The back arm main body defines a back arm deck end, a back arm midsection, and a back arm frame end.

The back frame end of the back main body includes a back threaded rod extending along the axis from the back frame bearing to the back mid bearing. The back arm first connecting rod is connected by the back arm frame end support bearing to the back arm frame end of the back arm main body. The back frame end support bearing includes a rod end bearing adapted to be adjustably positioned on the back threaded rod extending from the back frame end of the back main body. The back arm frame end support bearing is adapted to pivotally support the back arm first connecting rod at an angle greater than 45 degrees measured from a back arm main body central axis to a back arm first connecting rod central axis.

The back arm midsection of the back arm main body defines a back arm offset section supported by the back arm deck end and back arm frame end of the back arm main body along a parallel axis to the back arm main body central axis. The back midsection of the back main body defines a back mid support bearing aperture. The back midsection support bearing includes a rod end bearing supported by a rod bolted through the back mid support bearing aperture in the midsection of the main body. The back arm midsection support bearing is supported off the back arm offset section of the back arm main body such that the back arm first bearing and back arm second bearing are supported along a back arm bearing axis parallel to the back arm main body central axis.

The back arm deck end of the back arm main body defines a back arm dog ear support extending perpendicular from the back arm main body central axis and oriented perpendicular to the extension of the back arm mid support bearing from the back arm central axis. The back arm dog ear defines a back arm frame connection aperture.

The back hangar bracket defines at least one back connection ear and further defines a back hangar aperture adapted to connect to the back frame connecting rod. The back multiple ear hangar bracket defines first and second back connection ears and further defines a back hangar aperture adapted to connect to the back frame end connecting rod.

Reference numbers used in the drawings are noted as follows:
prior art fixed pin quad arm mounting system 100
mower deck 102
four suspension joints 104, 106, 108, 110
front right perpendicular pin 112
front right pin head 114
front right link aperture 116
front right pin extension 118
spring clip aperture 120
pin opening 122
mower frame 124
retaining spring 126
front right pin axis 128
front right link 130.

front right axial link extension 132
having extension threads 134
nuts 136
front right deck pin 138
front right pin aperture 140
front right deck flange 142
front left perpendicular pin 144
front left pin head 146
front left link aperture 148
front left pin extension 150
front left pin axis 152
front left link 154.
front left axial link extension 156
front left deck flange 158
back right frame pin 160
back right suspension arm 162
back right frame pin aperture 163
back right offset 164
back right central aperture 166
back right central pin 168
back right pin head 170
back right pin extension 172
back right lifting aperture 173
back right lifting link 174, also known as back right deck height adjustment bar 174
back right lifting extension 176
right lifting threads 178
back right lower dog ear 180
extending downward from the back right arm central axis 182
back right ear aperture 184
back right fixed position mower pin 186
back right deck flange 188
back left frame pin 190
back left frame pin aperture 191
back left suspension arm 192
back left offset 194
back left central aperture 196
back left central pin 198
back left pin head 200
back left pin extension 202
back left lifting link 204, also known as back left deck height adjustment bar 204
back left lifting extension 206
left lifting threads 208
back left lower dog ear 210
back left arm central axis 212
back left ear aperture 214
back left fixed position mower pin 216
back left deck flange 218
mower support replacement kit apparatus 500
floating front support arm apparatus 502
floating height adjustment back support arm apparatus 504
lawn tractor support frame 506
front left frame aperture 508
front right frame aperture 510
back left frame aperture 512
back right frame aperture 514
front left vertical-only pivot connection 522
front right vertical-only pivot connection 524
back left vertical-only pivot connection 526
back right vertical-only pivot connection 528
front left floating arm 532
front left main body 534
front left body axis 536
front left deck end 538
front left midsection 540
front left frame end 542
front left two dimensional pivot, front two dimensional support pivot 544
front left rod end bearing 546
front left frame pin extension 548, front left connecting rod 548
front right floating arm 550
front right main body 552
front right two dimensional pivot 554
front right frame pin extension 556
back left support assembly 558
back left floating arm 560
back left main body 562
back left deck end 564
back left dog ear support 566
back left deck connection aperture 568
back left threaded rod 570
back left midsection 572
back left offset section 574
back left parallel axis 576
back left mid support bearing aperture 578
back left frame end 580
back left main body central axis 582
back left vertically oriented two dimensional central pivot 584
back left midsection support bearing 586
back left mid rod end bearing 588
back left mid bearing extension 590
back left horizontally oriented two dimensional end pivot 592
back left frame end support bearing 594
back left frame rod end bearing 596
back left bearing axis 598
back left frame pin extension 600
back left drop frame 606
back left hangar bracket 608
back left connection ear 610, also known as back left first and second connection ears 610
back left hangar aperture 614
back right support assembly 658
back right floating arm 660
back right main body 662
back right deck end 664
back right dog ear support 666
back right deck connection aperture 668
back right threaded rod 670
back right midsection 672
back right offset section 674
back right parallel axis 676
back right mid support bearing aperture 678
back right frame end 680
back right main body central axis 682
back right vertically oriented two dimensional central pivot 684
back right midsection support bearing 686
back right mid rod end bearing 688
back right mid bearing extension 690
back right horizontally oriented two dimensional end pivot 692
back right frame end support bearing 694
back right frame rod end bearing 696
back right bearing axis 698
back right frame pin extension 700
back right drop frame 706
back right hangar bracket 708
back right connection ear 710, also known as back right first and second connection ears 710
back right hangar aperture 714

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A mower support replacement kit apparatus adapted to improve the lateral float of a mower deck having front left, front right, back left, and back right vertical-only pivot connections, the mower deck suspended from a lawn tractor assembled support frame defining front left, front right, back left, and back right frame apertures and a back left, and back right deck height adjustment bar, the kit apparatus comprising:

a front left floating arm pivotally supported from the frame to vertically pivot in relation to the mower deck and vertically, horizontally, and rotationally pivot in relation to the lawn tractor frame;

a front right floating arm pivotally supported from the frame to vertically pivot in relation to the mower deck and vertically, horizontally, and rotationally pivot in relation to the lawn tractor frame;

a back left support assembly pivotally supported from the frame to vertically pivot in relation to the mower deck and vertically, horizontally, and rotationally pivot in relation to the lawn tractor frame; and a back right support assembly pivotally supported from the frame to vertically pivot in relation to the mower deck and vertically, horizontally, and rotationally pivot in relation to the lawn tractor frame.

2. The apparatus of claim 1, the front left floating arm including a front left main body, a front left two dimensional pivot, and a front left frame pin extension, the front left main body connected to the front left vertical-only pivot connection on the mower deck, the front left frame pin extension connected to the front left main body by the front left two dimensional pivot, the front left frame pin extension connected to the front left frame aperture.

3. The apparatus of claim 1, the front right floating arm including a front right main body, a front right two dimensional pivot, and a front right frame pin extension, the front right main body connected to the front right vertical-only pivot connection on the mower deck, the front right frame pin extension connected to the front right main body by the front right two dimensional pivot, the front right frame pin extension connected to the front right frame aperture.

4. The apparatus of claim 1, the back left support assembly including a back left floating arm and a back left drop frame, the back left floating arm including a back left main body, a back left vertically oriented two dimensional central pivot, a back left horizontally oriented two dimensional end pivot, and a back left frame pin extension, the back left main body connected to the back left vertical-only pivot connection on the mower deck, the back left vertically oriented two dimensional central pivot slideably connected to the back left deck height adjustment bar, the back left frame pin extension connected to the back left main body by the back left horizontally oriented two dimensional end pivot, the back left frame pin extension connected to the back left drop frame, and the back left drop frame connected to the mower frame.

5. The apparatus of claim 1, the back right support assembly including a back right floating arm and a back right drop frame, the back right floating arm including a back right main body, a back right vertically oriented two dimensional central pivot, a back right horizontally oriented two dimensional end pivot, and a back right frame pin extension, the back right main body connected to the back right vertical-only pivot connection on the mower deck, the back right vertically oriented two dimensional central pivot slideably connected to the back right deck height adjustment bar, the back right frame pin extension connected to the back right main body by the back right horizontally oriented two dimensional end pivot, the back right frame pin extension connected to the back right drop frame, and the back right drop frame connected to the mower frame.

6. The apparatus of claim 1, the front left floating arm including a front left main body, a front left two dimensional pivot, and a front left frame pin extension, the front left main body connected to the front left vertical-only pivot connection on the mower deck, the front left frame pin extension connected to the front left main body by the front left two dimensional pivot, the front left frame pin extension connected to the front left frame aperture; and the front right floating arm including a front right main body, a front right two dimensional pivot, and a front right frame pin extension, the front right main body connected to the front right vertical-only pivot connection on the mower deck, the front right frame pin extension connected to the front right main body by the front right two dimensional pivot, the front right frame pin extension connected to the front right frame aperture.

7. The apparatus of claim 1, the back left support assembly including a back left floating arm and a back left drop frame, the back left floating arm including a back left main body, a back left vertically oriented two dimensional central pivot, a back left horizontally oriented two dimensional end pivot, and a back left frame pin extension, the back left main body connected to the back left vertical-only pivot connection on the mower deck, the back left vertically oriented two dimensional central pivot slideably connected to the back left deck height adjustment bar, the back left frame pin extension connected to the back left main body by the back left horizontally oriented two dimensional end pivot, the back left frame pin extension connected to the back left drop frame, and the back left drop frame connected to the mower frame; and the back right support assembly including a back right floating arm and a back right drop frame, the back right floating arm including a back right main body, a back right vertically oriented two dimensional central pivot, a back right horizontally oriented two dimensional end pivot, and a back right frame pin extension, the back right main body connected to the back right vertical-only pivot connection on the mower deck, the back right vertically oriented two dimensional central pivot slideably connected to the back right deck height adjustment bar, the back right frame pin extension connected to the back right main body by the back right horizontally oriented two dimensional end pivot, the back right frame pin extension connected to the back right drop frame, and the back right drop frame connected to the mower frame.

8. A floating front support arm apparatus adapted to improve the lateral float of an undercarriage mower deck having a vertical only connection point, the mower deck being supported off of a mower frame having a connection aperture, the apparatus comprising:

a main body defining a body axis, the main body including a first end, a midsection, and a second end;

a connecting rod;

a two dimensional support pivot connecting the second end of the main body to the connecting rod perpendicular to the body axis, wherein the two dimensional support pivot is adapted to provide longitudinal support to the main body at the second end while allowing vertical, horizontal, and rotational movement of the main body in relation to the mower frame.

9. The apparatus of claim 8, the two dimensional support pivot comprising:

a rod end bearing.

10. A floating height adjustment back support arm apparatus adapted to improve the lateral float of an undercarriage mower deck, the apparatus comprising:

a main body defining a first end, a midsection, and a second end;

a first connecting rod;

a first perpendicular support bearing adapted to support the first connecting rod off the second end of the main body, wherein the first perpendicular support bearing is adapted to pivotally support the first connecting rod at an angle greater than 45 degrees measured from a main body central axis to a first connecting rod central axis;

the midsection of the main body defining an offset section supported by the first end and second end of the main body along a parallel axis to the main body central axis;

a second perpendicular support bearing supported off the offset section of the main body such that the first bearing and second bearing are supported along a bearing axis parallel to the main body central axis;

the first end of the main body defining a dog ear support extending perpendicular from the main body central axis and oriented perpendicular to the extension of the mid support bearing from the central axis, the dog ear defining a frame connection aperture.

11. The apparatus of claim 10, wherein the first end of the main body includes a threaded rod extending along the axis from the first bearing to the second bearing;

wherein the first support bearing includes a rod end bearing adapted to be adjustably positioned on the threaded rod extending from the first end of the main body.

12. The apparatus of claim 10, wherein the midsection of the main body defines a mid support bearing aperture; and, the mid support bearing includes a rod end bearing supported by a rod bolted through the mid support bearing aperture in the midsection of the main body.

13. The apparatus of claim 10, further comprising:

a hangar bracket defining at least one connection ear and further defining a hangar aperture adapted to connect to the first connecting rod.

14. The apparatus of claim 10, further comprising:

a multiple ear hangar bracket defining first and second connection ears and further defining a hangar aperture adapted to connect to the first connecting rod.

15. A floating front support arm apparatus adapted to improve the lateral float of an undercarriage mower deck having a vertical only connection point, the mower deck being supported off of a mower frame having a connection aperture, the apparatus comprising:

a main body having a first end and a second end defining a body axis;

a rod end bearing having a multiple angle bearing mounted in a housing, the multiple angle bearing connected to the second end of the main body such that the housing is perpendicular to the body axis, wherein the rod end bearing is adapted to provide longitudinal support to the main body at the second end while allowing vertical, horizontal, and rotational movement of the main body in relation to the mower frame.

16. A floating height adjustment back support arm apparatus adapted to improve the lateral float of an undercarriage mower deck suspended from a mower frame and controlled by a height adjustment link, the apparatus comprising:

a main body defining a first end and a second end defining a body axis and a midsection;

a rod end frame bearing having a first multiple angle bearing mounted in a first housing, the first multiple angle bearing connected to the second end of the main body such that the first housing is perpendicular to the body axis, wherein the rod end frame bearing is adapted to provide longitudinal support to the main body at the second end while allowing vertical, horizontal, and rotational movement of the main body in relation to the mower frame;

the midsection of the main body defining an offset section supported by the first end and second end of the main body; and a rod end link bearing having a second multiple angle bearing mounted in a second housing, the second multiple angle bearing connected to the height adjustment link and the second housing connected to the midsection of the main body, wherein the rod end link bearing is adapted to provide longitudinal support to the main body at the midsection while allowing horizontal, linear, rotational, and limited vertical movement of the main body in relation to the mower link.

17. The apparatus of claim 16, the first end of the main body defining a dog ear support extending perpendicular from the main body central axis and oriented perpendicular to the extension of the second housing from the central axis, the dog ear defining a frame connection aperture.

* * * * *